2,877,265

SULPHONIUM COMPOUNDS

Frank Peter Doyle and Edward Raymond Stove, Brockham Park, Betchworth, England, assignors to Beecham Research Laboratories Limited, Betchworth, England, a British company No Drawing. Application November 19, 1956
Serial No. 622,827

Claims priority, application Great Britain
November 28, 1955

9 Claims. (Cl. 260—501)

This invention relates to novel sulphonium quaternary ammonium salts.

Hereinafter the abbreviations "Me," "Et," "Pr$^n$," "Pr$^i$" and "Bu$^n$" refer respectively to the methyl, ethyl, n-propyl, isopropyl and n-butyl radicals.

It has been found according to the present invention that certain novel compounds of the general formula:

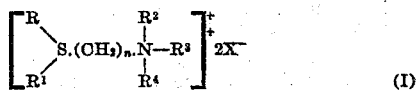

have marked hypotensive activity (as measured in laboratory animals). It has been found that such marked hypotensive activity is present in the series in those cases in which $n=4$, 5 or 6, especially 4 or 5.

In the general Formula I, R, R$^1$, R$^2$, R$^3$ and R$^4$ are the same or different, and each of which is an alkyl group, and X is an anion.

The novel compounds of the present invention are those in which $n=4$, 5 or 6, preferably 4 or 5, and the total number of carbon atoms in the cation is from 11 to 16 inclusive, and preferably from 13 to 15 inclusive.

Accordingly, the present invention provides novel compounds of the general Formula I in which $n=4$, 5 or 6, preferably 4 or 5, R, R$^1$, R$^2$, R$^3$ and R$^4$ are the same or different and each of which is an alkyl group, and X is an anion, the total number of carbon atoms in the cation being from 11 to 16 inclusive and preferably from 13 to 15 inclusive.

The compound of the general Formula I in which $n=4$, R=R$^1$=R$^2$=R$^3$=R$^4$=Me prepared by Schneider and Kaufmann (Annalen, 1912, 392, 10) by fully methylating the amine $$CH_3.S.(CH_2)_4.NH_2 \qquad (II)$$

with methyl iodide in the presence of sodium methoxide has only very slight activity whereas the compound of the general Formula I in which $n=4$, R=R$^1$=R$^2$=R$^3$=R$^4$=Et, whose preparation is described in Example 1 below, is very active as a hypotensive agent.

The nature of the anion X$^-$ is not of primary importance and may be chosen from any of the usual accepted groupings such as halide, sulphate or tartrate, the choice depending upon pharmaceutical convenience and the physical properties (stability, solubility, etc.) desired, although of course toxic anions such as the oxalate ion should be avoided. The preparation of organic acid salts from the halide salt may be carried out by reaction with the silver salt of the appropriate acid or by reaction with the appropriate acid in presence of ethylene oxide (cf. Sackur, Bull. Soc. chim., 1952, 796).

The preferred compounds of Formula I are the salts of 1 - diethylsulphonium - 4 - triethylammoniumbutane, 1 - ethylmethylsulphonium - 4 - triethylammoniumbutane, 1 - ethylmethylsulphonium - 4 - ethyldi - n - propylammoniumbutane, 1 - dimethylsulphonium - 4 - methyldiisopropylammoniumbutane, 1 - ethylmethylsulphonium-4 - methyldi-isopropylammoniumbutane, 1 - methylisopropylsulphonium - 4 - methyldiisopropylammoniumbutane, 1 - dimethylsulphonium - 4 - methyldi - n - propylammoniumbutane, 1 - diethylsulphonium - 5 - triethylammoniumpentane, and 1 - ethylmethylsulphonium-5-ethyldi-n-propylammoniumpentane.

The novel compounds of the present invention may be prepared by treating an appropriate di-N-substituted alkylthioalkylamine or a mono-quaternary salt thereof with an excess of a quaternising agent such as methyl iodide, with or without a diluent such as acetone or alcohol.

The term "quaternising agent" as used herein refers to an agent which renders the nitrogen atom quaternary and/or the sulphur atom ternary.

The di-N-substituted alkylthioalkylamines (cf. general Formula III below), in which the total number of carbon atoms is from 9 to 14 inclusive, preferably from 11 to 13 inclusive, are new compounds and may be prepared by the reaction of the appropriate haloalkylamine as its hydrohalide salt (usually the chloroalkylamine as its hydrochloride) with a metal salt of an alkanethiol (usually in excess) in a solvent (usually ethanol). (Cf. Brighton and Reid, J. Amer. Chem. Soc., 1943, 65, 458; Andrews, Bergel and Morrison, J. C. S., 1953, 2998, and Kirchner, Soria and Cavallito, J. Amer. Chem. Soc., 1955, 77, 4599.)

An alternative route for the preparation of di-N-substituted alkylthioalkylamines is the conversion of the appropriate di-N-substituted hydroxyalkylamine to the thioalkylamine by the action of hydrobromic acid and thiourea (cf. Frank and Smith, J. Amer. Chem. Soc., 1946, 68, 2103; Plant, Tarbell and Whiteman, ibid, 1955, 77, 1572) followed by basification and alkylation of the thiol group thus formed by the usual methods.

The following reaction scheme illustrates how the compounds may be prepared:

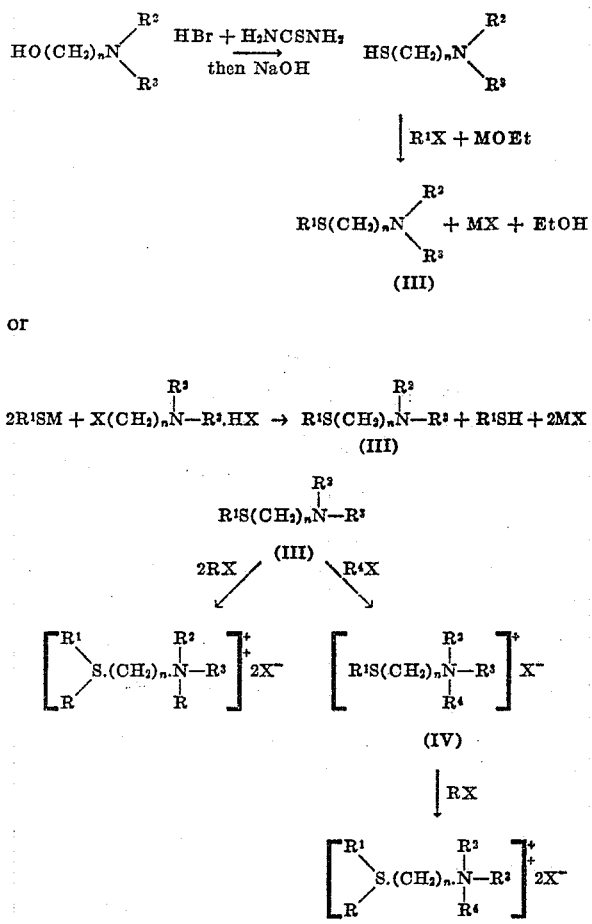

The following examples illustrate how the process of the invention may be carried into effect.

Compounds where $n=4$:

EXAMPLE 1.—1-DIETHYLSULPHONIUM - 4 - TRIETHYLAMMONIUMBUTANE DI-IODIDE

*Method 1.*—Ethyliodide (4.9 ml.) was added to solution of 4-ethylthiobutyldiethylamine (1.9 g.) in dry acetone (20 ml.) and the resulting solution stirred under reflux on a water bath for 8 hours. After removal of the first crop of crystalline material (2.2 g.) M. P. 143° C. (decomp.) the mother-liquor was refluxed for a further 14 hours to give a second crop (1.1 g.) M. P. 139–140° C. (decomp.). The combined yield (3.3 g.) was recrystallised from ethanol (10 ml.) to give colourless prisms (2.9 g., 59%) M. P. 142° C. (decomp.). (Found: C, 33.4; H, 6.5; I, 50.3. $C_{14}H_{33}NSI_2$ requires: C, 33.5; H, 6.6; I, 50.6%.)

The dihydrogentartrate salt was prepared by shaking an aqueous solution of the di-iodide (1 mole) with a slurry of neutral silver tartrate (1 mole) in aqueous tartaric acid (1 mole). The precipitated silver iodide was removed by filtration, the filtrate concentrated in vacuo (water pump) and the semi-solid white crystalline mass dried in vacuo (no desiccant) to give white crystalline powder (97%) M. P. 103–104° C. Recrystallisation from 95% v./v. ethanol gave clusters of colourless needles of the dihydrate M. P. 103–105° C. (Found: C, 45.7; H, 8.0; S, 5.9. $C_{22}H_{43}O_{12}NS \cdot 2H_2O$ requires: C, 45.45; H, 8.1; S, 5.5%.)

An alternative method for the conversion of the di-iodide to the di-hydrogentartrate follows that described by Sackur (loc. cit.) in which the di-iodide (1 mole) and tartaric acid (3 moles) in warm concentrated alcoholic solution were treated with ethylene oxide (4 moles). The di-hydrogentartrate precipitated and was purified as described above.

*Method 2.*—Ethyl iodide (0.81 ml.) was mixed with 4-ethylthiobutyldiethylamine (1.9 g.) and the mixture allowed to react for 7 days at room temperature without solvent. The resulting solid was digested with dry ether, collected by filtration and purified by dissolving in acetone (5 ml.) and precipitating with dry ether (10 ml.) to give 4-ethylthiobutyltriethylammonium iodide as colourless needles (2.0 g., 58%), M. P. 95–97° C. (Found: C, 42.1; H, 8.0; I, 36.8. $C_{12}H_{28}NSI$ requires: C, 41.7; H, 8.1; I, 36.8%.)

Ethyliodide (2.0 ml.) was added to a solution of 4-ethylthiobutyltriethylammonium iodide (1.8 g.) in warm dry acetone (10 ml.) and the resulting solution stirred under reflux on a water bath for 24 hours. The solution was cooled, the product collected by filtration (2.0 g., 76%) and crystallised from ethanol to give colourless prisms, M. P. 138–140° C. (decomp.). (Found: I, 50.6%.)

*4-ethylthiobutyldiethylamine*

*Method A.* — *4-chlorobutyldiethylamine hydrochloride.*—A solution of thionyl chloride (97 ml.) in dry chloroform (200 ml.) was added to a stirred solution of 4-hydroxybutyldiethylamine (156 g.) (Avison, J. Appl. Chem. 1951, 1, 469) in dry chloroform (160 ml.) with external cooling (solid carbon dioxide bath). The mixture was allowed to warm to room temperature, refluxed for 0.5 hour, and then concentrated initially at normal pressure, and finally in vacuo, to remove traces of chloroform. The residual oil was azeotroped twice with dry benzene and then cooled when it crystallised. The product was used in the next stage of the synthesis without further purification.

*4-ethylthiobutyldiethylamine*

Ethyl mercaptan (290 ml.) was added to a cooled solution of sodium (89 g.) in ethanol (2 l.). The solution was brought just to reflux temperature and 4-chlorobutyldiethylamine hydrochloride (the total crude yield from above) in ethanol (550 ml.) added over about 1 hour. The mixture was refluxed for 2 hours and the alcohol was then distilled as completely as possible from a boiling water bath (normal pressure). The residue was cooled, diluted with water (1.5 l.) and extracted with ether (3 x 1 l.). The combined extracts were washed with water (3 x 250 ml.), dried ($MgSO_4$), concentrated and distilled in vacuo to give the product as a colourless oil (172.8 g., 87%) B. P. 105–113° C./10 mm., $n_D^{21}$ 1.4705. (Found: C, 63.6; H, 12.3; S, 16.9. $C_{10}H_{23}NS$ requires: C, 63.5; N, 12.2; S, 16.9%.)

*Method B.*—*4-mercaptobutyldiethylamine.*—4-hydroxybutyldiethylamine (145 g.) was added with stirring to 48% hydrobromic acid (350 ml.). Thiourea (91 g.) was then added, and the mixture refluxed for 8 hours. The solution was cooled and, in an atmosphere of nitrogen, caustic soda solution (160 g. NaOH, in 640 ml. water) was added, and the mixture refluxed for 2 hours under nitrogen. The oily layer was separated, combined with 7 x 150 ml. ether extracts of the aqueous layer which were then dried, concentrated, and distilled in vacuo to give the product as a colourless oil (113 g., 70%) B. P. 95–96° C./15 mm. $n_D^{20}$ 1.4678.

*4-ethylthiobutyldiethylamine*

4-mercaptobutyldiethylamine (161 g.) was added to a cooled solution of sodium (23 g.) in ethanol (460 ml.), ethyl bromide (120 g.) was added, and the mixture refluxed for 3 hours. The reaction mixture was filtered to remove the precipitated sodium bromide, the filtrate concentrated, filtered, and distilled in vacuo to give the product (152 g., 80%) as a colourless oil.

EXAMPLE 2.—1-ETHYLMETHYLSULPHONIUM-4-TRIETHYLAMMONIUMBUTANE DI-IODIDE

Ethyl iodide (8.4 ml.) and 4-methylthiobutyldiethylamine (3.0 g.) were allowed to react together in nitromethane (8.4 ml.) for 1 week at room temperature. Dry ether (25 ml.) was added, the oily product was allowed to settle, and supernatant nitromethane/ether layer was removed and replaced by acetone. The product was induced to crystallise and was then recrystallised twice from n-butanol (40 ml.) at 75° C. to give a pale yellow deliquescent crystalline solid (3.3 g., 40%) M. P. 114–116° C. (decomp.). (Found: C, 31.8; H, 6.9; S, 6.6; I, 52.0. $C_{13}H_{31}NSI_2$ requires: C, 32.1; H, 6.4; S, 6.6; I, 52.1%.)

4-methylthiobutyldiethylamine

4 - chlorobutyldiethylamine hydrochloride prepared from 4-hydroxybutyldiethylamine (11.9 g.) and thionyl chloride (7.4 ml.) as in Example 1, Method A, was dissolved in ethanol (40 ml.) and added over a period of about 10 minutes to ethanolic sodium methane thiol (147 ml. of the solution prepared as described in "Organic Syntheses," Coll. Vol. II, p. 345, and containing 1 mole in 460 ml.) which had been brought just to reflux temperature. The mixture was refluxed for 2 hours and then the alcohol was distilled as completely as possible from a boiling water bath (normal pressure). The residue was cooled, diluted with water (200 ml.) and extracted with ether (3 x 100 ml.). The combined extracts were washed with water (3 x 40 ml.), dried ($MgSO_4$), concentrated, and distilled in vacuo to give the product as a colourless oil (12.1 g., 86%) B. P. 108–112° C./19 mm. $\eta_D^{20}$ 1.4718. Styphnate M. P. 71–73° C. from ethanol. (Found: C, 42.9; H, 5.9; N, 13.2. $C_{15}H_{24}N_4O_8S$ requires: C, 42.8; H, 5.7; N, 13.3%.)

EXAMPLE 3. — 1-ETHYLMETHYLSULPHONIUM-4-ETHYLDI - n - PROPYL - AMMONIUMBUTANE DI-IODIDE

Ethyl iodide (4.9 ml.) was added to a solution of 4-methyl-thiobutyldi-n-propylamine (2.0 g.) in dry acetone (20 ml.) and the resulting solution allowed to stand at room temperature for 2 months. The supernatant acetone layer was decanted, the oily product washed with dry acetone (20 ml.), and the product allowed to stand covered with further dry acetone (20 ml.) for several hours when it crystallised (2.3 g., 45%), M. P. 101–104° C. (decomp.). Recrystallisation from n-propanol, gave colourless crystals, M. P. 98–101° C. (decomp. 112° C.). (Found: C, 35.3; H, 7.1; I, 49.1. $C_{15}H_{35}NSI_2$ requires: C, 35.0; H, 6.8; I, 49.3%.)

4-methylthiobutyldi-n-propylamine

Reaction of β-carbomethoxypropionyl chloride (1 mole) with di-n-propylamine (2 moles) in dry ether gave methyl N:N-di-n-propylsuccinamate as an almost colourless oil, B. P. 96–100° C./0.3 mm. $\eta_D^{20}$ 1.4560, which on reduction with lithium aluminium hydride (1.5 moles) gave 4-hydroxybutyldi-n-propylamine as a colourless oil, B. P. 124° C./14 mm. $\eta_D^{21}$ 1.4489. 4-chlorobutyldi-n-propylamine hydrochloride (prepared from 4-hydroxybutyldi-n-propylamine (70 g.) and thionyl chloride as in Example 1, Method A), was reacted with sodium methane thiol as described in Example 2 to give 4-methylthiobutyldi-n-propylamine as a colourless oil B. P. 120–121° C./10 mm. $\eta_D^{20}$ 1.4678. (Found: C, 64.6; H, 12.6; N, 7.3. $C_{11}H_{25}NS$ requires: C, 65.0; H, 12.3; N, 6.9%.)

EXAMPLE 4. — 1 - DIMETHYLSULPHONIUM - 4-METHYLDI - ISOPROPYL - AMMONIUMBUTANE-DI-IODIDE

Methyl iodide (2.5 ml.) was added to a solution of 4-methylthiobutyldi-isopropylamine (2.0 g.) in dry acetone (20 ml.) and the resulting solution allowed to stand at room temperature for 8 days. The product was collected by filtration (4.2 g.) and recrystallised twice, first from isopropanol (33 ml.) just at its boiling point, and then from isopropanol (180 ml.) at 70° C. to give a yellow crystalline powder (1.9 g., 39%), M. P. 100–104° C. (decomp.). (Found: C, 32.0; H, 6.6; I, 52.2. $C_{13}H_{31}NSI_2$ requires: C, 32.0; H, 6.4; I, 52.5%.)

4-methylthiobutyldi-isopropylamine

Reaction of β-carbomethoxypropionyl chloride (1 mole) with di-isopropylamine (2 moles) in dry ether gave methyl-N:N-di-isopropylsuccinamate as an almost colourless oil, B. P. 112–116° C./0.05 mm. $\eta_D^{22}$ 1.4548 which on reduction with lithium aluminium hydride (2 moles) gave 4-hydroxybutyldi-isopropylamine as a colourless oil, B. P. 110° C./10 mm. $\eta_D^{19}$ 1.4541. 4-chlorobutyldi-isopropylamine hydrochloride (prepared from 4-hydroxybutyldi-isopropylamine and thionyl chloride as in Example 1, Method A) was reacted with sodium methane thiol as described in Example 2 to give 4-methylthiobutyldi-isopropylamine as a colourless oil B. P. 123° C./13 mm. $\eta_D^{22}$ 1.4683. (Found: C, 65.0; H, 12.3; N, 7.1; S, 15.6. $C_{11}H_{25}NS$ requires: C, 65.0; H, 12.3; N, 6.9; S, 15.8%.)

EXAMPLE 5.—1-ETHYLMETHYLSULPHONIUM-4-METHYLDI - ISOPROPYL - AMMONIUMBUTANE DI-IODIDE

Methyl iodide (2.5 ml.) was added to a solution of 4-ethylthiobutyldi-isopropylamine (2.2 g.) in dry acetone (20 ml.) and the resulting solution allowed to stand at room temperature for 24 hours. The product was collected by filtration (4.5 g.), recrystallised twice from isopropanol (10 ml.), and further purified by dissolving in nitromethane (3 ml.) and precipitating with dry acetone (10 ml.) This latter procedure was carried out three times to give deliquescent colourless microprisms (1.0 g., 20%), M. P. 140–141° C. (decomp.). (Found: C, 33.8; H, 6.8; S, 6.1; I, 50.5. $C_{14}H_{33}NSI_2$ requires: C, 33.5; H, 6.6; S, 6.4; I, 50.6%.)

4-ethylthiobutyldi-isopropylamine 4-chlorobutyldi-isopropylamine hydrochloride (see Example 4) was reacted with sodium ethane thiol as in Example 1, Method A, to give 4-ethylthiobutyldi-isopropylamine as a colourless oil, B. P. 136–137° C./16 mm. $\eta_D^{25}$ 1.4657. (Found: C, 65.9; H, 12.4; N, 6.8. $C_{12}H_{27}NS$ requires: C, 66.4; H, 12.5; N, 6.5%.)

EXAMPLE 6. — 1 - METHYLISOPROPYLSULPHONIUM-4-METHYLDI-ISOPROPYLAMMONIUMBUTANE DI-IODIDE

Methyl iodide (2.5 ml.) and 4-isopropylthiobutyldi-isopropylamine (2.3 g.) were allowed to react together in nitro-methane (10 ml.) for 4 days. The product was collected by filtration (3.0 g.) and recrystallised, first from nitro-methane (4.5 ml.) on a boiling water bath and then from 96% v./v. aqueous isopropanol (16.5 ml.) to give colourless rods (0.9 g., 17%), M. P. 163–164° C. (decomp.). (Found: C, 34.6; H, 7.1; S, 6.1; I, 49.7. $C_{15}H_{35}NSI_2$ requires: C, 34.9; H, 6.8; S, 6.2; I, 49.3%.)

4-isopropylthiobutyldi-isopropylamine 4-chlorobutyldi-isopropylamine hydrochloride (see Example 4) was reacted with sodium isopropane thiol to give 4-isopropylthiobutyldi-isopropylamine as a colourless oil B. P. 133–136° C./10 mm. $\eta_D^{23}$ 1.4662. (Found: C, 67.3; H, 12.4; N, 6.2. $C_{13}H_{29}NS$ requires: C, 67.5; H, 12.6; N, 6.1%.)

Similar methods were employed for the preparation of the compounds shown in the following examples:

| Example No. | Formula | Reaction Conditions for Quaternisation | Recrystallisation Solvent and M.P. | Analysis |
|---|---|---|---|---|
| 7 | $I^-\left[\begin{array}{c}Me\\ \diagdown\\ S(CH_2)_4\overset{+}{N}\diagup Me\\ \diagup\qquad\diagdown\\ Et\qquad Et\end{array}\right]I^-$ | In acetone at room temp. for 1 week. | n-Butanol at 90–100° C., M.P. 130–131° C. (decomp.). Deliquescent. | Found: C, 29.1; H, 6.4; I, 55.3%. Requires: C, 28.8; H, 5.9; I, 55.4%. |
| 8 | $I^-\left[Me_2\overset{+}{S}(CH_2)_4\overset{+}{N}\diagup Me\atop \diagdown Et\atop Et\right]I^-$ | In acetone at room temp. for 1 day. | Ethanol, M.P. 111–115° C. (decomp.). Deliquescent. | Found: C, 29.0; H, 6.1; I, 55.1%. Requires: C, 28.8; H, 5.9; I, 55.4%. |
| 9 | $I^-\left[Et_2\overset{+}{S}(CH_2)_4\overset{+}{N}\diagup Me\atop \diagdown Me\atop Et\right]I^-$ | In acetone at room temp. for 18 days. | n-Butanol at 90–100° C., M.P. 107–111° C. (decomp.). | Found: I, 53.5%. Requires: I, 53.6%. |
| 10 | $I^-\left[\begin{array}{c}Me\\ \diagdown\\ S(CH_2)_4\overset{+}{N}\diagup Me\\ \diagup\qquad\diagdown\\ Et\qquad Et\end{array}\right]I^-$ | In acetone at room temp. for 1 day. | n-Butanol at 70–80° C., M.P. 110–114° C. (decomp.). Deliquescent. | Found: C, 30.6; H, 6.1; I, 53.5%. Requires: C, 30.4; H, 6.1; I, 53.6%. |
| 11 | $I^-\left[Me_2\overset{+}{S}(CH_2)_4\overset{+}{N}\diagup Me\atop \diagdown Pr^n\atop Pr^n\right]I^-$ | In acetone at room temp. for 5 days. | Ethanol, M.P. 129–130° C. (decomp.), M.P. 111–113° C. (decomp.) (dimorphic). | Found: C, 31.9; H, 6.6; I, 52.0%. Requires: C, 32.0; H, 6.4; I, 52.2%. |
| 12 | $I^-\left[\begin{array}{c}Me\\ \diagdown\\ S(CH_2)_4\overset{+}{N}\diagup Me\\ \diagup\qquad\diagdown\\ Pr^n\qquad Pr^n\end{array}\right]I^-$ | do | n-Butanol at approx. 90° C., M.P. 91–93° C. Deliquescent. | Found: C, 34.7; H, 6.9; I, 49.3%. Requires: C, 34.9; H, 6.8; I, 49.3%. |
| 13 | $Br^-\left[Me_2\overset{+}{S}(CH_2)_4\overset{+}{N}\diagup Me\atop \diagdown Bu^n\atop Bu^n\right]Br^-$ | In acetone at room temp. for 1 day. | Dissolved in n-butanol at approx. 70° C. and pptd. with acetone, M.P. 111–114° C. (decomp.). Deliquescent. | Found: C, 42.5; H, 8.6; Br, 38.1%. Requires: C, 42.7; H, 8.3; Br, 38.0%. |
| 14 | $I^-\left[\begin{array}{c}Et\\ \diagdown\\ S(CH_2)_4\overset{+}{N}\diagup Et\\ \diagup\qquad\diagdown\\ Pr^n\qquad Pr^n\end{array}\right]I^-$ | In acetone at room temp. for 50 days. | Dissolved in n-butanol at approx. 70° C. and pptd. with ether, M.P. 100–102° C. (decomp.). | Found: C, 36.0; H, 7.4; I, 47.4%. Requires: C, 36.3; H, 7.0; I, 48.0%. |

ACTIVITY (EFFECT ON THE BLOOD PRESSURE OF NORMOTENSIVE RATS) OF THE EXAMPLES WHERE $n=4$

| Example No. | Total Carbon Atoms | Activity | Example No. | Total Carbon Atoms | Activity |
|---|---|---|---|---|---|
| 1 | 14 | >Hexamethonium | 8 | 11 | >Hexamethonium. |
| 2 | 13 | Do | 9 | 12 | <Hexamethonium. |
| 3 | 15 | Do | 10 | 12 | >Hexamethonium. |
| 4 | 13 | Do | 11 | 13 | Do. |
| 5 | 14 | Do | 12 | 15 | <Hexamethonium. |
| 6 | 15 | Do | 13 | 15 | =Hexamethonium. |
| 7 | 11 | <Hexamethonium | 14 | 16 | >Hexamethonium. |

Compounds where $n=5$:

EXAMPLE 15.—1-DIETHYLSULPHONIUM-5-TRIETHYLAMMONIUMPENTANE DI-IODIDE

Ethyl iodide (24.3 ml.) was added to a solution of 5-ethylthioamyldiethylamine (10.0 g.) in dry acetone (100 ml.) and the resulting solution, after being stirred under reflux on a water bath for 8 hours was allowed to cool. The product was collected by filtration and recrystallised from ethanol (168 ml.) to give colourless plates (17.5 g., 68%), M. P. 160–161° C. (decomp.). (Found: C, 35.0; H, 6.8; I, 49.6. $C_{15}H_{35}NSI_2$ requires: C, 35.0; H, 6.8; I, 49.3%.)

*5-ethylthioamyldiethylamine*

5-chloroamyldiethylamine hydrochloride (Chem. Abs., 1934, 28, 1770) was prepared from 5-hydroxyamyldiethylamine (Avison, loc. cit.) and reacted with sodium ethanethiol as in Example 1, Method A, to give 5-ethylthioamyldiethylamine as a faintly straw-coloured oil, B. P. 113° C./5 mm. $\eta_D^{18}$ 1.4702. (Found: C, 65.0; H, 12.5; N, 7.2. $C_{11}H_{25}NS$ requires: C, 65.0; N, 12.3; N, 6.9%.)

EXAMPLE 16. — 1-ETHYLMETHYLSULPHONIUM-5-ETHYL-DI - n - PROPYLAMMONIUMPENTANE DI-IODIDE

Ethyl iodide (4.9 ml.) was added to a solution of 5-methylthioamyldi-n-propylamine (2.2 g.) in dry acetone (20 ml.) and the resulting solution allowed to stand at room temperature for 1 month. The product was collected by filtration (4.8 g.) and recrystallised from n-propanol (9 ml.) at 90–95° C. to give small colourless rods (3.6 g., 68%), M. P. 126–127° C. (decomp.). (Found: C, 36.2; H, 7.4; I, 48.3. $C_{16}H_{37}NSI_2$ requires: C, 36.2; H, 7.0; I, 48.0%.)

*5-methylthioamyldi-n-propylamine*

Reaction of γ-carbomethoxybutyryl chloride (1 mole) with di-n-propylamine (1 mole) in the presence of triethylamine (1 mole) in dry ether gave methyl-N:N-di-n-propylglutaramate as a colourless oil, B. P. 125° C./0.7 mm., $\eta_D^{17}$ 1.4580. Reduction of the latter with lithium aluminium hydride (1.5 moles) gave 5-hydroxyamyldi-n-propylamine as a colourless oil, B. P. 122–126° C./7 mm. $\eta_D^{15}$ 1.4545. This was converted via 5-chloroamyldi-n-propylamine hydrochloride as in Example 2, to 5-methylthioamyldi-n-propylamine, a colourless oil, B. P. 141° C./13 mm. $\eta_D^{25}$ 1.4654. (Found: C, 66.0; H, 12.2; S, 14.8. $C_{12}H_{27}NS$ requires: C, 66.4; H, 12.4; S, 14.7%.)

Similar methods were employed for the preparation of the compounds shown in the following examples:

| Example No. | Formula | Reaction Conditions for Quaternisation | Recrystallisation Solvent and M.P. | Analysis |
|---|---|---|---|---|
| 17 | $I^- [\overset{Me}{\underset{Et}{>}}\overset{+}{S}(CH_2)_5\overset{+}{N}\overset{Me}{\underset{Et}{<}}] I^-$ | In acetone at room temp. for 2 weeks. | Ethanol, M. P. 155—157° C. (decomp.). | Found: C, 30.4; H, 6.1; I, 53.4%. Requires: C, 30.4; H, 6.1; I, 53.6%. |
| 18 | $I^- [Me_2\overset{+}{S}(CH_2)_5\overset{+}{N}\overset{Me}{\underset{Et}{<}}\text{-Et}] I^-$ | In acetone at room temp. for 1 day. | Ethanol, M. P. 144—148° C. (decomp.). | Found: C, 30.3; H, 6.3; I, 53.5%. Requires: C, 30.4; H, 6.1; I, 53.6%. |
| 19 | $I^- [\overset{Me}{\underset{Et}{>}}\overset{+}{S}(CH_2)_5\overset{+}{N}\overset{Me}{\underset{Et}{<}}\text{-Et}] I^-$ | ..do.. | Ethanol, M. P. 136—138° C. (decomp.). | Found: C, 32.3; H, 6.6; I, 52.2%. Requires: C, 32.0; H, 6.4; I, 52.2%. |
| 20 | $I^- [Me_2\overset{+}{S}(CH_2)_5\overset{+}{N}\overset{Me}{\underset{Pr^n}{<}}\text{-Pr}^n] I^-$ | In acetone at room temp. for 1 month. | n-Propanol at approx. 70° C., M. P. 110—112° C. (decomp.). Deliquescent. | Found: C, 33.9; H, 6.9; I, 50.4%. Requires: C, 33.5; H, 6.6; I, 50.6%. |

ACTIVITY (EFFECT ON THE BLOOD PRESSURE OF NORMOTENSIVE RATS) OF THE EXAMPLES WHERE $n=5$

| Example No. | Total Carbon Atoms | Activity | Example No. | Total Carbon Atoms | Activity |
|---|---|---|---|---|---|
| 15 | 15 | > Hexamethonium. | 18 | 12 | = Hexamethonium. |
| 16 | 16 | Do. | 19 | 13 | > Hexamethonium. |
| 17 | 12 | = Hexamethonium. | 20 | 14 | = Hexamethonium. |

Compounds where $n=6$: The following examples were prepared by methods similar to those already described for the compounds where $n=4$ and $n=5$.

| Example No. | Formula | Reaction Conditions for Quaternisation | Recrystallisation Solvent and M.P. | Analysis |
|---|---|---|---|---|
| 21 | $I^-[Me_2\overset{+}{S}(CH_2)_6\overset{+}{N}Me_2]I^-$ | Room temp. for 1 day without other solvent. | Ethanol, M.P. 158—160° C. (decomp.). | Found: C, 29.0; H, 6.2; N, 2.7; S, 7.1%. Requires: C, 28.8; H, 5.9; N, 3.1; S, 7.0%. |
| 22 | $I^-[\overset{Me}{\underset{Et}{>}}\overset{+}{S}(CH_2)_6\overset{+}{N}Me_2]I^-$ | In acetone at room temp. for 2 days. | Ethanol, M.P. 117-120° C. (decomp.). | Found: C, 30.3; H, 6.3; I, 53.4%. Requires: C, 30.4; H, 6.1; I, 53.6%. |
| 23 | $I^-[\overset{Me}{\underset{Et}{>}}\overset{+}{S}(CH_2)_6\overset{+}{N}\overset{Me}{\underset{Et}{<}}]I^-$ | In acetone at room temp. for 8 days. | Ethanol, M.P. 89-91° C. (decomp.). | Found: C, 31.9; H, 6.3; N, 2.8%. Requires: C, 32.0; H, 6.4; N, 2.9%. |
| 24 | $I^-[\overset{Me}{\underset{Et}{>}}\overset{+}{S}(CH_2)_6\overset{+}{N}\overset{Me}{\underset{Et}{<}}\text{-Et}]I^-$ | In acetone at room temp. for 1 day. | Ethanol, M.P. 110-114° C. (decomp.). | Found: C, 33.6; H, 7.0; I, 50.9%. Requires: C, 33.5; H, 6.6; I, 50.6%. |
| 25 | $I^-[Et_2\overset{+}{S}(CH_2)_6\overset{+}{N}\overset{Me}{\underset{Et}{<}}\text{-Me}]I^-$ | In acetone at room temp. for 15 days. | Ethanol, M.P. 118-121° C. (decomp.). | Found: C, 33.7; N, 6.9; I, 50.4%. Requires: C, 33.5; H, 6.6; I, 50.6%. |
| 26 | $I^-[\overset{Me}{\underset{Pr^i}{>}}\overset{+}{S}(CH_2)_6\overset{+}{N}\overset{Me}{\underset{Pr^i}{<}}\text{-Me}]I^-$ | In nitromethane at room temp. for 6 weeks. | iso-Propanol, M.P. 110-114° C. (decomp.). | Found: C, 35.2; H, 7.1; I, 49.0%. Requires: C, 34.9; H, 6.8; I, 49.3%. |
| 27 | $I^-[\overset{Me}{\underset{Pr^n}{>}}\overset{+}{S}(CH_2)_6\overset{+}{N}\overset{Me}{\underset{Pr^n}{<}}\text{-Me}]I^-$ | In acetone at room temp. for 2 months or at 40° C. for 10 days. | n-Propanol at 90° C., M.P. 103-104° C. | Found: S, 6.7; I, 49.1%. Requires: S, 6.2; I, 49.3%. |
| 28 | $I^-[\overset{Me}{\underset{Bu^n}{>}}\overset{+}{S}(CH_2)_6\overset{+}{N}\overset{Me}{\underset{Bu^n}{<}}\text{-Me}]I^-$ | Room temp. for 4 days without other solvent. | n-Butanol at 90-100° C., M.P. 153-155° C. (decomp.). | Found: C, 37.3; H, 7.4; I, 46.7%. Requires: C, 37.6; H, 7.2; I, 46.8%. |
| 29 | $I^-[Et_2\overset{+}{S}(CH_2)_6\overset{+}{N}Et_2]I^-$ | In acetone at room temp. for 2 months. | Ethanol, M.P. 140-141° C. (decomp.). | Found: C, 36.6; H, 7.4; I, 47.8%. Requires: C, 36.3; H, 7.0; I, 48.0%. |

ACTIVITY (EFFECT ON THE BLOOD PRESSURE OF NORMOTENSIVE RATS) OF THE EXAMPLES WHERE $n=6$

| Example No. | Total Carbon Atoms | Activity | Example No. | Total Carbon Atoms | Activity |
|---|---|---|---|---|---|
| 21 | 11 | <Hexamethonium. | 26 | 15 | <Hexamethonium. |
| 22 | 12 | =Hexamethonium. | 27 | 15 | Do. |
| 23 | 13 | Do. | 28 | 15 | Do. |
| 24 | 14 | <Hexamethonium. | 29 | 16 | Do. |
| 25 | 14 | Do. | | | |

We claim:
1. Compounds of the general formula:

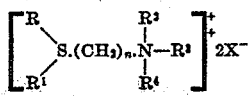

in which $n$ is an integer of from 4 to 6 inclusive, R, $R^1$, $R^2$, $R^3$ and $R^4$ are each an alkyl group, and X is a non-toxic anion, the total number of carbon atoms in the cation being from 11 to 16 inclusive.

2. Compounds of the general formula:

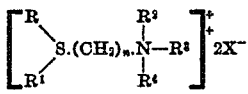

in which $n$ is an integer of from 4 to 6 inclusive, R, $R^1$, $R^2$, $R^3$ and $R^4$ are each an alkyl group, and X is a non-toxic anion, the total number of carbon atoms in the cation being from 13 to 15 inclusive.

3. Compounds of the general formula:

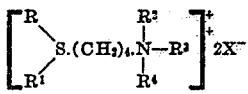

in which R, $R^1$, $R^2$, $R^3$ and $R^4$ are each an alkyl group and X is a non-toxic anion, the total number of carbon atoms in the cation being from 11 to 16 inclusive.

4. Compounds of the general formula:

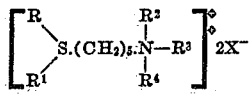

in which R, $R^1$, $R^2$, $R^3$ and $R^4$ are each an alkyl group and X is a non-toxic anion, the total number of carbon atoms in the cation being from 11 to 16 inclusive.

5. Non-toxic salts of 1-diethylsulphonium-4-triethylammonium-butane.

6. Non-toxic salts of 1-ethylmethylsulphonium-4-ethyl-di-n-propyl-ammoniumbutane.

7. Non-toxic salts of 1-methylisopropylsulphonium-4-methyldi-iso-propylammoniumbutane.

8. Non-toxic salts of 1-diethylsulphonium-5-triethyl-ammonium-pentane.

9. Non-toxic salts of 1-ethylmethylsulphonium-5-ethyl-di-n-propylammoniumpentane.

References Cited in the file of this patent
UNITED STATES PATENTS

| 2,483,671 | Rieveschl | Oct. 9, 1949 |
| 2,648,710 | Morrison et al. | Aug. 11, 1953 |
| 2,689,867 | Mahan | Sept. 21, 1954 |

OTHER REFERENCES

Schneider et al.: Ann. 392, pp. 3 and 10 (1912).